United States Patent
Pankratz

(10) Patent No.: US 12,523,870 B2
(45) Date of Patent: Jan. 13, 2026

(54) OPTICAL SYSTEMS FOR HUD SYSTEMS

(71) Applicant: 3M INNOVATIVE PROPERTIES COMPANY, St. Paul, MN (US)

(72) Inventor: Stephan J. Pankratz, Eagan, MN (US)

(73) Assignee: 3M INNOVATIVE PROPERTY COMPANY, St. Paul, MN (US)

( * ) Notice: Subject to any disclaimer, the term of this patent is extended or adjusted under 35 U.S.C. 154(b) by 667 days.

(21) Appl. No.: 17/797,475

(22) PCT Filed: Feb. 1, 2021

(86) PCT No.: PCT/IB2021/050777
§ 371 (c)(1),
(2) Date: Aug. 4, 2022

(87) PCT Pub. No.: WO2021/156727
PCT Pub. Date: Aug. 12, 2021

(65) Prior Publication Data
US 2023/0013999 A1   Jan. 19, 2023

Related U.S. Application Data

(60) Provisional application No. 62/971,251, filed on Feb. 7, 2020.

(51) Int. Cl.
*G02B 27/01* (2006.01)
*B60K 35/00* (2024.01)
(Continued)

(52) U.S. Cl.
CPC .......... *G02B 27/0101* (2013.01); *B60K 35/22* (2024.01); *B60K 35/231* (2024.01);
(Continued)

(58) Field of Classification Search
CPC .. G02B 27/0101; G02B 5/3066; B60K 35/00; B60K 35/23; B60K 2360/23
(Continued)

(56) References Cited

U.S. PATENT DOCUMENTS

| | | |
|---|---|---|
| 5,882,774 A | 3/1999 | Jonza et al. |
| 6,101,032 A | 8/2000 | Wortman |
(Continued)

FOREIGN PATENT DOCUMENTS

| | | |
|---|---|---|
| EP | 3206058 B1 | 5/2019 |
| EP | 3385775 B1 | 8/2019 |
(Continued)

OTHER PUBLICATIONS

International Search Report for PCT International Application No. PCT/IB2021/050777, mailed on Apr. 20, 2021, 3 pages.

*Primary Examiner* — Balram T Parbadia
*Assistant Examiner* — Grant A Gagnon
(74) *Attorney, Agent, or Firm* — Jonathan L. Tolstedt

(57) ABSTRACT

An optical system includes a display including an active display region configured to emit an image. The active display region includes a predetermined region including a display center. A windshield of a vehicle includes an embedded reflective polarizer. The reflective polarizer reflects between about 20% to about 40% of incident light polarized along a first direction, and transmits at least 60% of the incident light polarized along a second direction. The reflective polarizer receives the image emitted by the active display region and reflects a portion toward the eye. For at least one first location within the predetermined region, the emitted image includes an image cone having an emitted central image ray emitted from the first location. The emitted central image ray is polarized along a third direction when incident on the windshield in an incident plane. The first and third directions are substantially parallel to the incident plane.

8 Claims, 4 Drawing Sheets

(51) Int. Cl.
  *B60K 35/22* (2024.01)
  *B60K 35/231* (2024.01)
  *B60K 35/60* (2024.01)
  *G02B 5/30* (2006.01)

(52) U.S. Cl.
  CPC .......... *B60K 35/60* (2024.01); *B60K 2360/23* (2024.01); *G02B 5/3066* (2013.01)

(58) Field of Classification Search
  USPC ........................................................ 359/485
  See application file for complete search history.

(56) References Cited

U.S. PATENT DOCUMENTS

| | | |
|---|---|---|
| 6,179,948 B1 | 1/2001 | Merrill et al. |
| 6,783,349 B2 | 8/2004 | Neavin et al. |
| 2005/0012682 A1 | 1/2005 | Jenson et al. |
| 2007/0216836 A1 | 9/2007 | Lippey |
| 2014/0029244 A1 | 1/2014 | Whitehead et al. |
| 2016/0091756 A1 | 3/2016 | Watano |
| 2017/0269361 A1 | 9/2017 | Xu |

FOREIGN PATENT DOCUMENTS

| | | |
|---|---|---|
| EP | 3001236 B1 | 11/2020 |
| JP | 2006512622 A | 4/2006 |
| WO | 2013059228 A1 | 4/2013 |
| WO | 2019145860 A1 | 8/2019 |
| WO | 2021165778 A1 | 8/2021 |

OPTICAL SYSTEMS FOR HUD SYSTEMS

CROSS REFERENCE TO RELATED APPLICATIONS

This application is a national stage filing under 35 U.S.C. 371 of PCT/IB2021/050777, filed Feb. 1, 2021, which claims the benefit of U.S. Application No. 62/971,251, filed Feb. 7, 2020, the disclosures of which are incorporated by reference in their entireties herein.

TECHNICAL FIELD

The disclosure generally relates to optical systems, particularly optical systems for heads up display systems.

BACKGROUND

Electronic displays are provided in many applications to render digital information to a viewer. A heads-up display (HUD) allows a viewer to view not only the information, but also a view through the HUD due to the transparent nature of the HUD. Thus, a viewer may be able to view the displayed information while not losing the ability to view the real world through the HUD. HUD systems have been developed particularly for use in high-speed vehicles such as aircraft, but are now increasingly being considered as a feature for other vehicles, including automobiles. In smaller scale, HUD systems are used as goggle lenses or helmet visors, or in other diverse virtual reality (VR) applications. The HUD may be implemented in a variety of surfaces and windows, for example, the front windshield of a vehicle. Thus, for an occupant in the vehicle, vehicle operational information, such as vehicle speed and/or navigation directions, or the like, may be displayed to the occupant on, say, the front windshield accordingly.

SUMMARY

Some aspects of the disclosure relate to an optical system including a display (10) having an active display region. The active display region has a maximum lateral dimension D and is configured to emit an image for viewing by an eye of a viewer. The active display region includes a display center and a predetermined region including the display center. The predetermined region includes a largest lateral dimension d, where $d/D \le 0.25$. The optical system further includes a windshield of a vehicle having a reflective polarizer embedded therein. For substantially normally incident light and for at least one wavelength between about 420 nm and about 670 nm, the reflective polarizer reflects between about 20% to about 40% of the incident light polarized along a first direction, and transmits at least 60% of the incident light polarized along an orthogonal second direction. The reflective polarizer is configured to receive the image emitted by the active display region and reflect a portion of the received image toward the eye. For at least one first location within the predetermined region of the active display region, the emitted image includes a first emitted image cone emitted from the first location. The first emitted image cone includes a first emitted central image ray emitted from the first location. The first emitted central image ray is substantially polarized along a third direction when incident on the windshield in an incident plane. The first and third directions are substantially parallel to the incident plane.

Some other aspects of the disclosure relate to an optical system including a display having an active display region. The active display region is configured to emit an image for viewing by an eye of a viewer. The optical system further includes a windshield of a vehicle having a reflective polarizer embedded therein. For substantially normally incident light and for at least one wavelength between about 420 nm and about 670 nm, the reflective polarizer reflects between about 20% to about 40% of the incident light polarized along a first direction, and transmits at least 60% of the incident light polarized along an orthogonal second direction. The reflective polarizer is configured to receive the image emitted by the active display region and reflect a portion of the received image toward the eye. The eye is configured to see a virtual image of the reflected image. The virtual image includes a maximum lateral dimension D', a virtual image center and a predetermined virtual image region including the virtual image center. The predetermined virtual image region includes a largest lateral dimension d', where $d'/D' \le 0.25$. For at least one first location within the predetermined virtual image region, the first location has a corresponding second location within the active display region. An image ray that is emitted by the active display region from the second location is substantially polarized along a third direction when incident on the windshield in an incident plane. The first and third directions are substantially parallel to the incident plane

BRIEF DESCRIPTION OF DRAWINGS

The various aspects of the disclosure will be discussed in greater detail with reference to the accompanying figures where.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

The term heads-up display (HUD) is used herein to refer to such display systems, whether employed in the window or windshield of a vehicle such as an aircraft, watercraft, or motor vehicles such as automobiles, trucks, and motorcycles, in smaller scale systems such as goggle lenses or helmet visors, or in other diverse applications.

Figure 1:
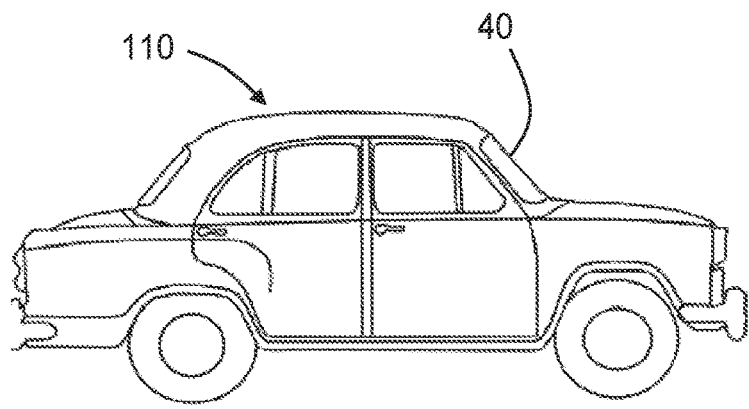
FIG. 1 shows a vehicle having a windshield on which an image is projected by a heads-up display (HUD) system.

For instance, as shown in FIG. 1, HUD systems project an image onto the windshield (40) of a vehicle (110) and allows the viewer (for example, the driver) to view the information in the form of a virtual image. The HUD system may be situated behind the steering wheel of the vehicle to create the image that is projected onto the windshield (40), which then reflects the light towards, say, the driver of the vehicle (110). The HUD systems may be configured to display one or more of a vehicle operating information such as vehicle speed, navigation information such as directions and/or a map, ambient information such as temperature, radio station or track listing, communication information such as caller information, and road sign information or restrictions such as an effective speed limit, etc.

HUD systems project the image onto the windshield (40) within a range of horizontal skew angles. The projected image is usually reflected on both surfaces of the windshield. Thus, the occupant of the vehicle views not only the desired primary virtual image but also a slightly offset secondary image, usually having a lesser intensity. The latter is commonly referred to as a ghost image. At larger skew angles the nominally p-polarized HUD output becomes increasingly rotated away from the fast/slow axis of a birefringent windshield combiner film (WCF), causing a retardation and alteration of the input linear polarization in transmission through the WCF and higher back glass-air surface ghost reflection. As HUD systems seek to realize wider HUD field of view for AR-HUD applications, the horizontal skew angle effect on polarization becomes increasingly significant. Embodiments described herein address these and other challenges.

Some embodiments of the present disclosure describe the addition of a bias angle to the WCF orientation within the windshield glass laminate such that the retardation effect and back ghost luminance is minimized over a desired range of HUD-WS skew angles. By applying a bias angle to the WCF, the retardance effect on the back ghost reflection can be minimized for a skew angle related to the bias angle. Thus the skew-angle region of minimal back ghost reflection due to S-pol ghosting can be shifted horizontally through the application of a WCF bias angle. This could be especially important when HUD polarization tuning is used to ensure that at a given incident and skew angle (or range) the incident light is polarized in its plane of incidence, because the larger the skew angle for such rays, the larger the rotation of the incidence plane from the optical axis of unbiased WCF.

Figure 2:
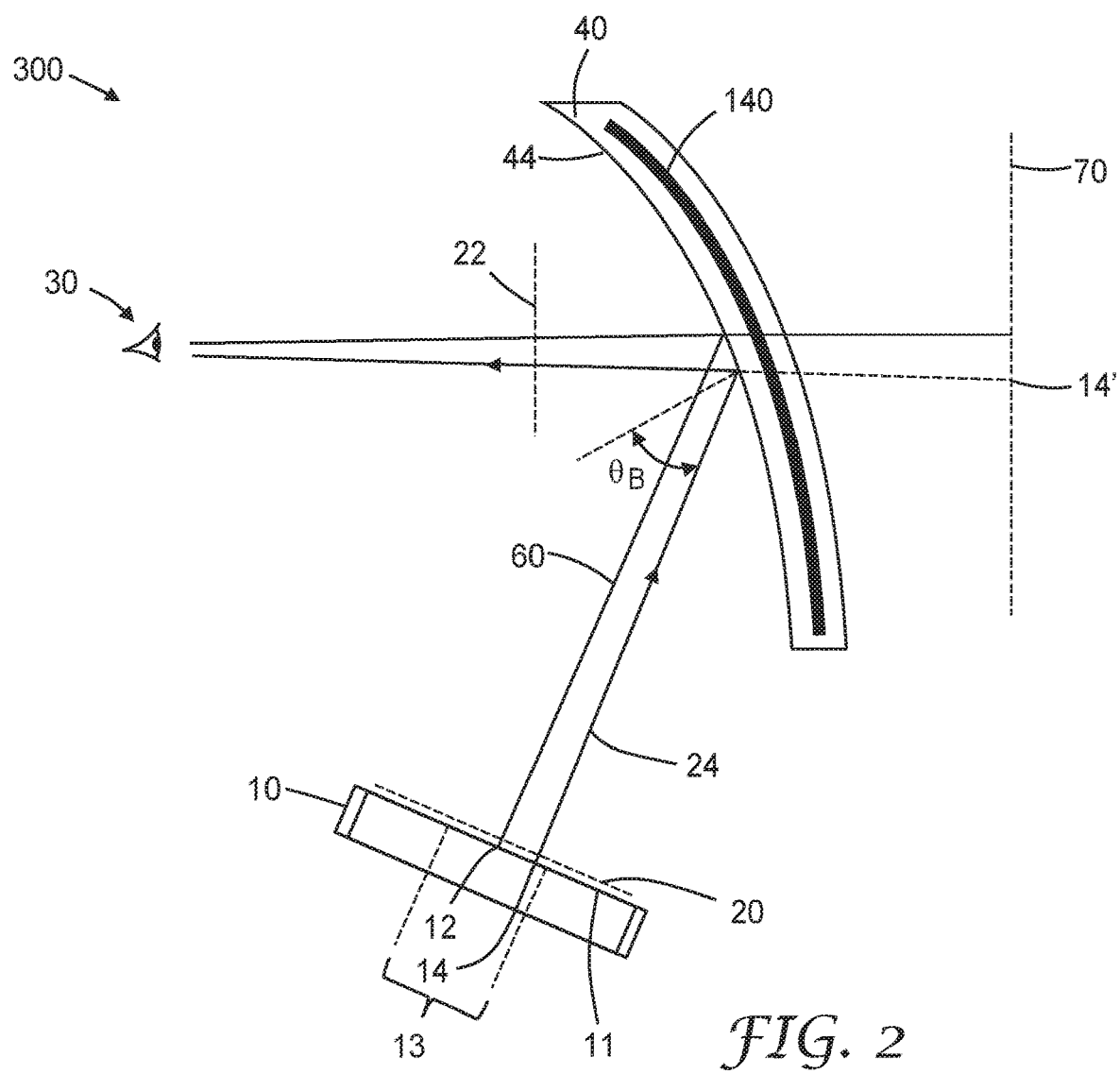
FIG. 2 schematically shows an optical system according to some embodiments of the disclosure.

An optical system (300) according to some aspects of the disclosure is illustrated in FIG. 2. The optical system (300) includes a display (10) having an active display region (11), and a windshield (40) of a vehicle (110) having a reflective polarizer (140) embedded therein. The active display region (11) is configured to emit an image (20) for viewing by an eye (30) of a viewer. The eye is configured to see a virtual image (70) of the reflected image to allow the viewer to view various types of information, such as speed, fuel level, temperature, warnings, directions, etc. on the windshield.

The display (10) may be a conventional system that projects a visible light beam or image, and may include liquid crystal display (LCD), or organic light emitting display (OLED). The display may also include known elements such as electroluminescent panel, incandescent or phosphorescent light source, CRT, LEDs, and lenses, collimators, reflectors, and/or polarizers. The emitted light can be substantially monochromatic, polychromatic, narrow band, or broad band, but preferably overlaps at least a portion of the (visible) spectrum from about 400 to 700 nm. The light emitted by the active display region (11) of the display (10) towards the windshield (40) is substantially linearly polarized. While it may be understood that display (11) will emit light over a finite angular cone, only one ray of light (24), hereinafter called first emitted central image ray, is depicted for ease of illustration. Furthermore, display (11) may also include a mechanism such as a tilting mirror or displacement means to change the angle and/or position of emitted light so as to accommodate viewers at different positions or heights. In some embodiments the display (11) may be a projection system.

Figure 3:
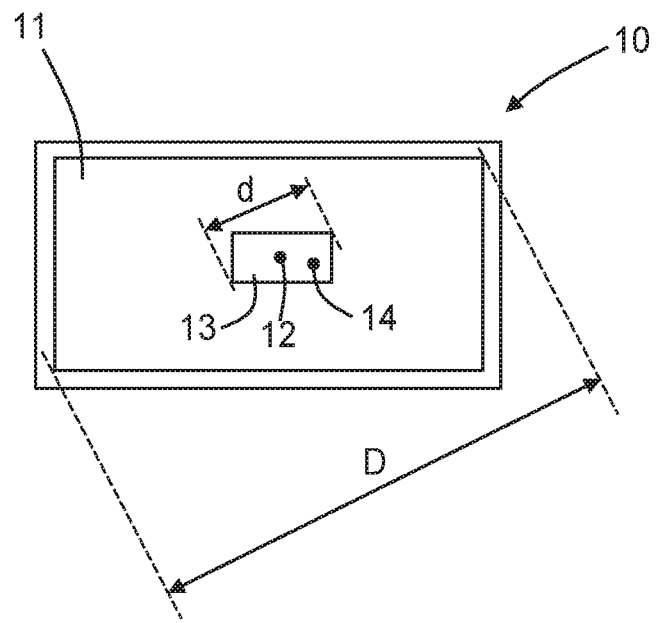
FIG. 3 schematically illustrates an active display region of a display of an optical system according to some embodiments.

The active display region (11) of the display may lie within a central region of display (10). A peripheral region surrounding the active display region (11) may form an inactive region of the display, where, for example, structures such as button and speaker port may, if desired, be formed. A schematic representation of an active display region (11) is shown in FIG. 3. The active display region (11) has a maximum lateral dimension D and includes a display center (12) and a predetermined region (13) including the display center (12). The predetermined region (13) has a largest lateral dimension d. In some embodiments, the dimensional relationship between the largest lateral dimension d of the predetermined region and the maximum lateral dimension D of the active display region may be such that $d/D \leq 0.25$. In some aspects, $d/D \leq 0.20$, or $d/D \leq 0.15$, or $d/D \leq 0.1$.

Figure 4:
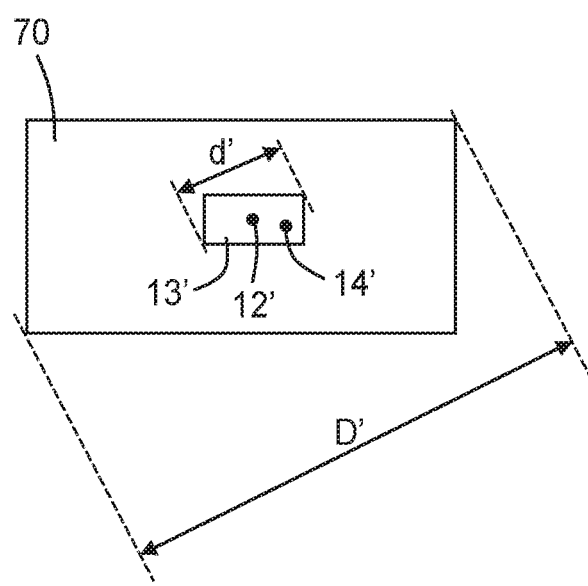
FIG. 4 schematically illustrates a virtual image of an image reflected by the windshield having a reflective polarizer according to some embodiments.

A schematic representation of the virtual image (70) of the reflected image that the eye is configured to see is shown in FIG. 4. The virtual image (70) has a maximum lateral dimension D'. Further, the virtual image (70) includes a virtual image center (12') and a predetermined virtual image region (13') including the virtual image center (12'). The predetermined virtual image region (13') includes a largest lateral dimension d'. In some embodiments, the dimensional relationship between the largest lateral dimension d' of the predetermined virtual image region (13') and the maximum lateral dimension D' of the virtual image (70) may be such that $d'/D' \leq 0.25$. In some aspects, $d'/D' \leq 0.20$, or $d'/D' \leq 0.15$, or $d'/D' \leq 0.1$.

In some aspects, for at least one first location (14') within the predetermined virtual image region (13'), the first location may have a corresponding second location (14) within the active display region (11). In other aspects, for each first location (14') within the predetermined virtual image region (13'), the first location has a corresponding second location (14) within the active display region (11). An image ray (24) that is emitted by the active display region (11) from the second location (14) may be substantially polarized along a third direction (15) when incident on the windshield (40) in an incident plane (50). In some aspects, the first (x-axis) and third (15) directions may be substantially parallel to the incident plane (50).

In some aspects, the reflective polarizer (140) embedded with the windshield (40) may generally include materials which transmit light of a first polarization and which reflect light of a second, different polarization. Reflecting polarizers include, by way of example and not of limitation, diffusely reflecting polarizers, multilayer reflective polarizers, and cholesteric reflective polarizers. The reflective polarizer (140) may be a wide-band reflective polarizer or a notch reflective polarizer. In other instances, the reflective polarizer (140) may be one or more of an absorbing linear polarizer, a multilayer polymeric reflective polarizer, or a laminate of a reflective polarizer, which substantially transmits light having a first polarization state (e.g., polarized along a first direction) and substantially reflects light having an orthogonal second polarization state (e.g., polarized along an orthogonal second direction). Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used. Other types of reflective polarizers (e.g., wire-grid polarizers) may also be used.

Figure 5:
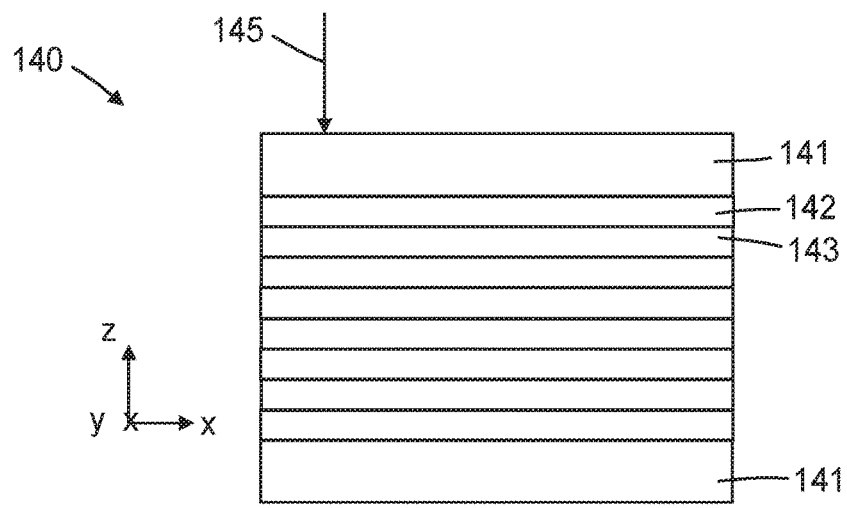
FIG. 5 schematically shows the construction of the reflective polarizer according to some aspects of the disclosure.

According to certain aspects, as best shown in FIG. 5, the reflective polarizer (140) may include plurality of layers (141, 142, 143) numbering greater than about 30 in total. In some embodiments, the plurality of layers may be polymeric layers numbering greater than 50, or greater than 100, or at least 150, or at least 200 in total. The plurality of layers of the reflective polarizer (140) may include a plurality of alternating first (142) and second (143) layers. Each of the first and second layers may have an average thickness of less than about 500 nm, or less than about 450 nm, or less than about 400 nm. A difference between indices of refraction of the first (142) and second (143) layers along the first polarization state or along the first direction may be greater than about 0.05, or greater than about 0.1 or, in some instance, greater than 0.2.

In some cases, the first and second layers (142, 143) may be alternately stacked isotropic and anisotropic layers. Reflective films (e.g., reflective polarizers) including a plurality of polymeric layers are described, for example, in U.S. Pat. No. 5,882,774 (Jonza et al.), U.S. Pat. No. 6,179,948 (Merrill et al.), and U.S. Pat. No. 6,783,349 (Neavin et al.), each of which is incorporated herein by reference to the extent that it does not contradict the present description. In some embodiments, the polymeric layers include one or more of a polycarbonate, a polymethyl methacrylate (PMMA), a polyethylene terephthalate (PET), a glycol-modified polyethylene terephthalate (PETG), a polyethylene naphthalate (PEN), and a PEN/PET copolymer.

In some aspects, the reflective polarizer (140) may include a skin layer (141) disposed on opposite top and bottom sides of the plurality of alternating first and second polymeric layers (142, 143). The skin layer (141) may have a thickness greater than about 1 micron. In some cases, the total thickness of the plurality of polymer layers (142, 143) may be about 10 to 300 microns, and the thickness of the skin layer may be 50 to 200 microns, but not limited thereto. The skin layer (141) and the plurality of alternating first and second layers (142, 143) may be bonded with each other using adhesives. The skin layer (141), for instance, may be made of polycarbonate or polycarbonate alloy, or polyethylene terephthalate (PET), or polystyrene (PS), or a combination thereof.

In some aspects, for substantially normally incident light (145) and for at least one wavelength between about 420 nm and about 670 nm, the reflective polarizer (140) may be said to substantially reflect the incident light (145) if between about 20% to 40% of the incident light (145) polarized along a first direction (x-axis) is reflected from the reflective polarizer (140). The reflective polarizer (140) may be said to substantially transmit the incident light (145) if at least 60% of the incident light (145) polarized along an orthogonal second direction (y-axis) is transmitted by the reflective polarizer (140). In some embodiments, at least 70%, or at least 80%, or at least 90% of the incident light (145) polarized along an orthogonal second direction (y-axis) may be transmitted by the polarizer (140). In some other embodiments, for the substantially normally incident light (145) and for at least one wavelength between about 700 nm and about 1500 nm, the reflective polarizer (140) may reflect at least 40%, or at least 50%, or at least 60-70% of the incident light polarized along the first (x-axis) or second (y-axis) direction.

Figure 6:
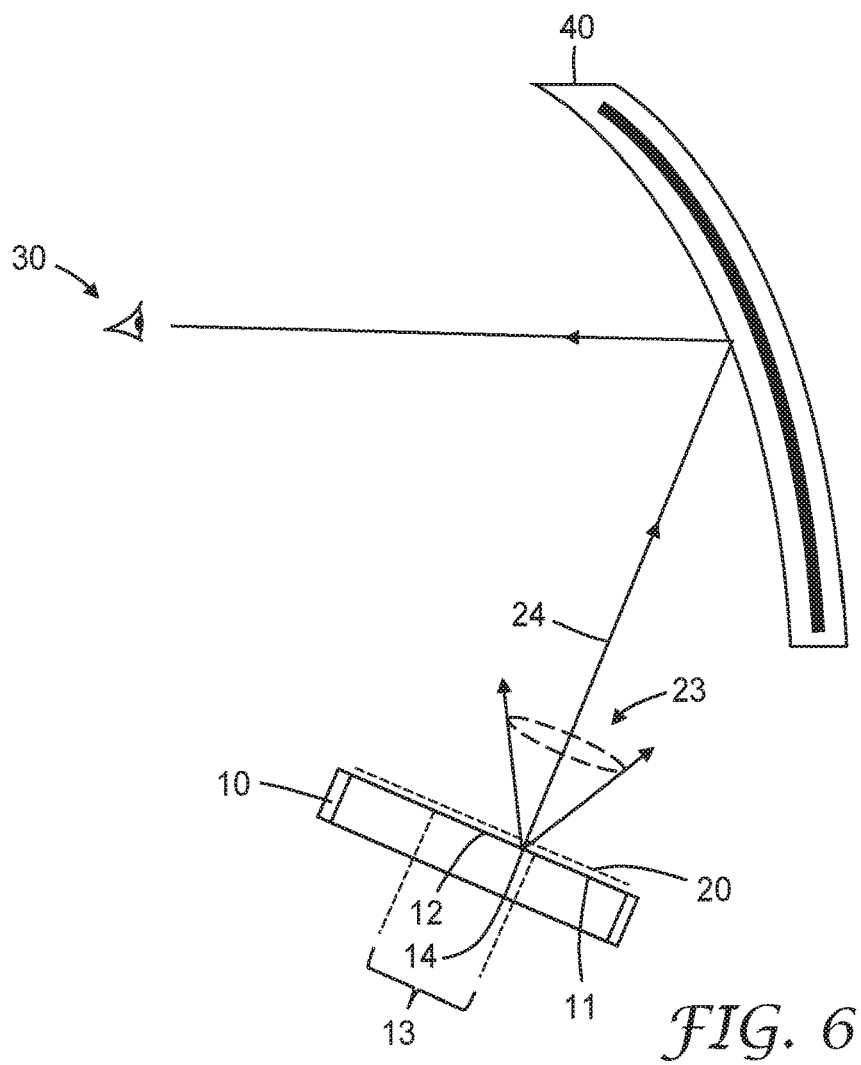
FIG. 6 schematically shows an optical system according to some aspects of the disclosure.
Figure 7:
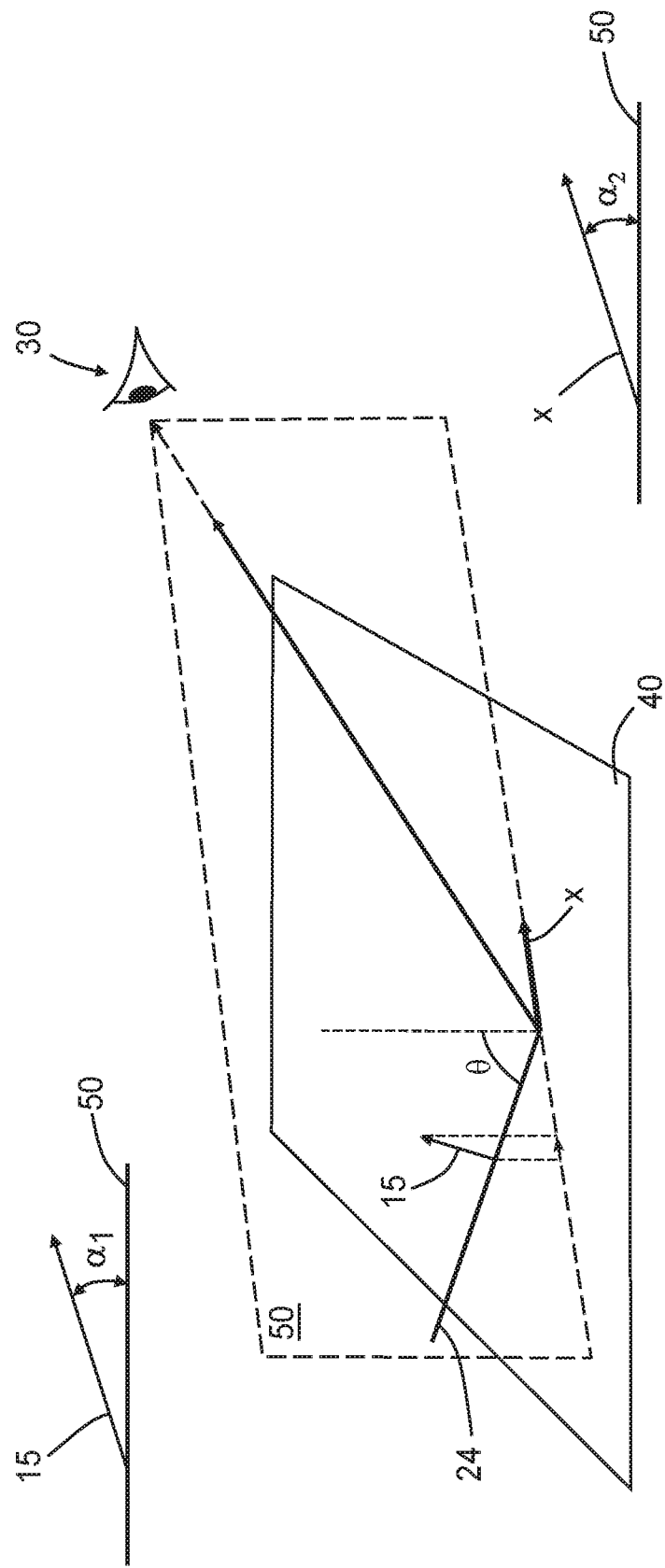
FIG. 7 schematically shows the relative orientations of the optical axis of the windshield with reflective polarizer and the plane of incidence for a ray projected toward the viewer according to some aspects of the disclosure.

In some embodiments, the reflective polarizer (140) may be configured to receive the image (20) emitted by the active display region (11) and reflect a portion (22) of the received image toward the eye (30). In some aspects, for at least one first location (14) within the predetermined region (13) of the active display region (11), the emitted image includes a first emitted image cone (23) emitted from the first location (14) as best shown in FIG. 6. While it may be understood that the at least one first location (14) within the predetermined region (13) of the active display region (11) will emit light over the first emitted image cone (23), only one ray of light is depicted for ease of illustration. In the illustrated embodiment, the first emitted image cone (23) includes a first emitted central image ray (24) emitted from the first location (14). As shown in FIG. 7, the first emitted central image ray (24) may be substantially polarized along a third direction (15) when incident on the windshield (40) in an incident plane (50). The first (x-axis) and third (15) directions may be substantially parallel to the incident plane (50).

In some embodiments, as illustrated in FIG. 7, the third direction (15) may make an angle ($\alpha_1$) less than about 10 degrees, or less than about 5 degrees, with the plane of incidence (50). In some other aspects, the first direction (x-axis) may make an angle ($\alpha_2$) less than about 10 degrees, or less than about 5 degrees, or less than about 3 degrees with the plane of incidence (50).

In some embodiments, the first emitted central image ray (24) may be incident on the windshield (40) at an incident angle ($\theta$) greater than about 30 degrees, or greater than about 40 degrees, or greater than about 50 degrees.

In some aspects, the optical system may be substantially centered on an optical axis (60) extending from the display center (12) to the eye (30). The optical axis (60) may include the first emitted central image ray (24).

In some aspects, the windshield may include glass. In some other aspects, as shown in the illustrations, the windshield may be curved. The windshield may include a first interface (44) and a corresponding first Brewster angle ($\theta_B$). In some aspects, the first emitted central image ray (24) may be incident on the first interface (44) of the windshield (40) at the first Brewster angle ($\theta_B$).

The combination of HUD image output polarization tuning along with appropriate reflective polarizer lamination angle bias can significantly and simultaneously reduce both the front ghost and back ghost contrast ratios at skew angles by reducing the S-pol component of the light incident onto the reflecting surfaces. In the case of the back ghost, this typically includes rotating the optical axis to minimize the effect on the polarization due to the retardance of the polarizer.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical system comprising:
a display comprising an active display region having a maximum lateral dimension D and configured to emit an image for viewing by an eye of a viewer, the active display region comprising a display center and a predetermined region comprising the display center, the predetermined region comprising a largest lateral dimension d, d/D≤0.25; and
a windshield of a vehicle comprising a reflective polarizer embedded therein, wherein for substantially normally incident light and for at least one wavelength between about 420 nm and about 670 nm, the reflective polarizer reflects between about 20% to about 40% of the incident light polarized along a first direction, and transmits at least 60% of the incident light polarized along an orthogonal second direction, the reflective polarizer configured to receive the image emitted by the active display region and reflect a portion of the received image toward the eye, such that for at least one first location within the predetermined region of the active display region, the emitted image comprises a first emitted image cone emitted from the first location, the first emitted image cone comprising a first emitted central image ray emitted from the first location, the first emitted central image ray substantially polarized along a third direction when incident on the windshield in an incident plane, the first and third directions substantially parallel to the incident plane;
wherein the optical system is substantially centered on an optical axis extending from the display center to the eye, wherein the optical axis comprises the first emitted central image ray.

2. The optical system of claim 1, wherein the windshield comprises a first interface and a corresponding first Brewster angle, and wherein the first emitted central image ray is incident on the first interface of the windshield at the first Brewster angle.

3. The optical system of claim 1, wherein the third direction makes an angle less than about 5 degrees with the plane of incidence, and the first direction makes an angle less than about 5 degrees with the plane of incidence.

4. The optical system of claim 1, wherein the reflective polarizer comprises a plurality of layers numbering greater than about 30 in total, wherein the plurality of layers of the reflective polarizer comprises a plurality of alternating first and second layers, each of the first and second layers having an average thickness of less than about 500 nm, a difference between indices of refraction of the first and second layers along the first direction being greater than about 0.05, and wherein the plurality of layers in the reflective polarizer number greater than about 100 in total.

5. The optical system of claim 1, wherein for the substantially normally incident light and for at least one wavelength between about 700 nm and about 1500 nm, the reflective polarizer reflects at least 40% of the incident light polarized along the first or second direction.

6. The optical system of claim 1, wherein the first emitted central image ray is incident on the windshield at an incident angle greater than about 40 degrees.

7. The optical system of claim 1, wherein the first emitted central image ray is incident on the windshield at an incident angle greater than about 50 degrees.

8. An optical system comprising:
a display comprising an active display region configured to emit an image for viewing by an eye of a viewer; and
a windshield of a vehicle comprising a reflective polarizer embedded therein, wherein for substantially normally incident light and for at least one wavelength between about 420 nm and about 670 nm, the reflective polarizer reflects between about 20% to about 40% of the incident light polarized along a first direction, and transmits at least 60% of the incident light polarized along an orthogonal second direction, the reflective polarizer configured to receive the image emitted by the active display region and reflect a portion of the received image toward the eye, the eye configured to see a virtual image of the reflected image, the virtual image having a maximum lateral dimension D', a virtual image center and a predetermined virtual image region comprising the virtual image center, the predetermined virtual image region comprising a largest lateral dimension d', d'/D'≤0.25, such that for at least one first location within the predetermined virtual image region, the first location has a corresponding second location within the active display region, wherein an image ray that is emitted by the active display region from the second location is substantially polarized along a third direction when incident on the windshield in an incident plane, the first and third directions substantially parallel to the incident plane;
wherein for each first location within the predetermined virtual image region, the first location has a corresponding second location within the active display region, wherein an image ray that is emitted by the active display region from the second location is substantially polarized along a third direction when incident on the windshield in an incident plane, the first and third directions substantially parallel to the incident plane.

* * * * *